United States Patent
Shimizu

(10) Patent No.: US 7,292,391 B2
(45) Date of Patent: Nov. 6, 2007

(54) METHOD OF MANUFACTURING A LENS SUBSTRATE WITH STRAIGHT LIGHT CONTROL PORTIONS, A LENS SUBSTRATE WITH STRAIGHT LIGHT CONTROL PORTIONS, A TRANSMISSION SCREEN AND A REAR PROJECTION

(75) Inventor: Nobuo Shimizu, Suwa (JP)

(73) Assignee: Seiko Epson Corporation (JP)

( * ) Notice: Subject to any disclaimer, the term of this patent is extended or adjusted under 35 U.S.C. 154(b) by 247 days.

(21) Appl. No.: 11/011,771

(22) Filed: Dec. 14, 2004

(65) Prior Publication Data

US 2005/0162747 A1    Jul. 28, 2005

(30) Foreign Application Priority Data

Dec. 15, 2003  (JP) .............................. 2003-417135

(51) Int. Cl.
*G03B 21/56* (2006.01)
(52) U.S. Cl. .................. 359/460; 359/457; 359/453
(58) Field of Classification Search ................ 359/452, 359/453, 455, 456, 460, 457
See application file for complete search history.

(56) References Cited

U.S. PATENT DOCUMENTS

| | | | | |
|---|---|---|---|---|
| 3,279,314 A | * | 10/1966 | Miller | .................... 359/453 |
| 5,066,099 A | * | 11/1991 | Yoshida et al. | ............ 359/457 |
| 6,411,639 B1 | * | 6/2002 | Namiwaka | .................. 372/92 |
| 6,700,702 B2 | * | 3/2004 | Sales | ........................ 359/443 |
| 6,888,853 B1 | | 5/2005 | Jurgensen | |
| 2002/0080482 A1 | * | 6/2002 | Watanabe et al. | ........... 359/452 |
| 2004/0100691 A1 | * | 5/2004 | Sinkoff | ..................... 359/449 |

FOREIGN PATENT DOCUMENTS

| | | |
|---|---|---|
| JP | 03-080236 | 4/1991 |
| JP | 04-282625 | 10/1992 |
| JP | 05-088142 | 4/1993 |
| JP | 05-183782 | 7/1993 |

(Continued)

OTHER PUBLICATIONS

Communications from Korean and Chinese Patent Office re: related applications.

(Continued)

*Primary Examiner*—W. B. Perkey
*Assistant Examiner*—Robert Do
(74) *Attorney, Agent, or Firm*—Harness, Dickey & Pierce, P.L.C.

(57) ABSTRACT

A method of manufacturing the lens substrate with straight light control portions 1A that is provided with a plurality of convex lenses (microlenses) 32 on a surface thereof and is used so that light enters the lens substrate from the side of the surface thereof on which the plurality of convex lenses 32 are provided includes the steps of: preparing a substrate having a plurality of concave portions on one surface thereof; forming the plurality of convex lenses 32 using the substrate having the plurality of concave portions; and forming a straight light control portion 4 in the vicinity of the apex of each of the plurality of convex lenses 32. The straight light control portion 4 is used for controlling the ratio of straight light in the light entering each of the plurality of convex lenses 32.

20 Claims, 9 Drawing Sheets

FOREIGN PATENT DOCUMENTS

| | | |
|---|---|---|
| JP | 05-273522 | 10/1993 |
| JP | 06-165095 | 6/1994 |
| JP | 06-312357 | 11/1994 |
| JP | 08-016242 | 1/1996 |
| JP | 08-085046 | 4/1996 |
| JP | 08-160426 | 6/1996 |
| JP | 08-292419 | 11/1996 |
| JP | 08-313706 | 11/1996 |
| JP | 10-048502 | 2/1998 |
| JP | 10-066659 | 3/1998 |
| JP | 11-147255 | 6/1999 |
| JP | 11-353925 | 12/1999 |
| JP | 2000-033833 | 2/2000 |
| JP | 2000-078444 | 3/2000 |
| JP | 2000-131506 | 5/2000 |
| JP | 2000-292830 | 10/2000 |
| JP | 2002-107598 | 4/2002 |
| JP | 2002-207168 | 7/2002 |
| JP | 2002-524263 | 8/2002 |
| JP | 2002-315453 | 10/2002 |
| JP | 2003-227989 | 8/2003 |
| JP | 2003-227992 | 8/2003 |
| JP | 2003-341422 | 12/2003 |
| JP | 2003-344715 | 12/2003 |

OTHER PUBLICATIONS

Communication from Japanese Patent Office re: related application.

* cited by examiner

METHOD OF MANUFACTURING A LENS SUBSTRATE WITH STRAIGHT LIGHT CONTROL PORTIONS, A LENS SUBSTRATE WITH STRAIGHT LIGHT CONTROL PORTIONS, A TRANSMISSION SCREEN AND A REAR PROJECTION

CROSS-REFERENCE TO RELATED APPLICATION

This application claims priority to Japanese Patent Application No. 2003-417135 filed Dec. 15, 2003, which is hereby expressly incorporated by reference herein in its entirety.

FIELD OF THE INVENTION

The present invention relates to a method of manufacturing a lens substrate with straight light control portions, a lens substrate with straight light control portions, a transmission screen and a rear projection.

BACKGROUND OF THE INVENTION

In recent years, demand for a rear projection is becoming increasingly strong as a suitable display for a monitor for a home theater, a large screen television, or the like. In a transmission screen used for the rear projection, a lenticular lens substrate is in general use. However, such a conventional rear projection provided with a lenticular lens substrate has a problem that the vertical angle of view thereof is small although the lateral angle of view thereof is large (namely, there is a bias in the angles of view).

As a solution to such a problem, there has been proposed a transmission screen which uses a microlens array sheet (microlens substrate) on which a plurality of microlenses each having a concave or convex structure that is optically rotationally symmetric are formed in place of the lenticular lens substrate (see, for example, Japanese Laid-Open Patent Application No. 2000-131506). However, although such a microlens array sheet has a feature that distribution of vertical and lateral view angles is sufficiently large, it is difficult to obtain sufficient view angle characteristics because a difference of luminous intensity becomes larger in accordance with an angle of view (that is, a view angle).

SUMMARY OF THE INVENTION

It is therefore one object of the present invention to provide a lens substrate with straight light control portions and a method of manufacturing the same which have excellent angle of view characteristics.

Further, it is another object of the present invention to provide a transmission screen and a rear projection which are provided with the lens substrate with straight light control portions.

In order to achieve the above objects, in one aspect of the present invention, the present invention is directed to a method of manufacturing a lens substrate with straight light control portions that is provided with a plurality of convex lenses on a surface thereof. The lens substrate is used so that light enters the lens substrate from the side of the surface thereof on which the plurality of convex lenses are provided. The method of the present invention includes the steps of:

preparing a substrate having a plurality of concave portions on one surface thereof;

forming the plurality of convex lenses using the substrate having the plurality of concave portions; and forming a straight light control portion in the vicinity of the apex of each of the plurality of convex lenses, the straight light control portion being used for controlling the ratio of straight light in the light entering each of the plurality of convex lenses.

This makes it possible to manufacture the lens substrate with straight light control portions which has excellent angle of view characteristics.

In the method of manufacturing the lens substrate with straight light control portions according to the invention, it is preferable that the straight light control portion is formed of a straight light control agent.

In another embodiment of the invention, the method of the present invention includes the steps of:

preparing a substrate having a plurality of concave portions on one surface thereof; and forming the plurality of convex lenses each having a straight light control portion in the vicinity of the apex thereof by applying a resin material to which a straight light control agent is added to the one surface of the substrate on which the plurality of concave portions are provided and then precipitating the straight light control agent in the vicinity of the bottom of each of the plurality of concave portions that corresponds to the apex of each convex lens, the straight light control portion being used for controlling the ratio of straight light in the light entering each of the plurality of convex lenses.

This makes it possible to manufacture the lens substrate with straight light control portions which has excellent angle of view characteristics.

In the method of manufacturing the lens substrate with straight light control portions according to the invention, it is preferable that the straight light control agent is mainly made of a light diffusion agent that has a function of diffusing light.

This makes it possible to control the straight light passing through the vicinity of the apex of each convex lens while keeping light use efficiency, the amount of the transmitted light, and the like as a whole effectively. As a result, it is possible to reduce the difference of luminous intensity in accordance with an angle of view sufficiently, and this makes it possible to improve the angle of view characteristics.

In the method of manufacturing the lens substrate with straight light control portions according to the invention, it is preferable that the straight light control agent is mainly made of a light shielding agent that has a function of reducing the amount of transmitted light as the whole lens substrate.

This makes it possible to control the ratio of the straight light in the light passing through each convex lens more effectively. As a result, it is possible to reduce the difference of luminous intensity in accordance with an angle of view sufficiently, and this makes it possible to improve the angle of view characteristics more effectively.

In the method of manufacturing the lens substrate with straight light control portions according to the invention, it is preferable that, in the case where a transmission ratio of light of the straight light control portion is defined as $X_1$ (%) and a transmission ratio of light in the case of not containing the straight light control agent in the straight light control portion is defined as $X_2$(%), then $X_1$ and $X_2$ satisfy the relation: $0.1 \leq X_1/X_2 \leq 1.0$.

This makes it possible to control the ratio of the straight light in the light entering each of the convex lenses more effectively. As a result, it is possible to reduce the difference of luminous intensity in accordance with an angle of view sufficiently, and this makes it possible to improve the angle of view characteristics more effectively.

In the method of manufacturing the lens substrate with straight light control portions according to the invention, it is preferable that the straight light control agent is particulate, and the average grain diameter of the straight light control agent is in the range of 0.1 to 200 μm.

This makes it possible to further improve the angle of view characteristics while keeping the light use efficiency at a high level as a whole.

In the method of manufacturing the lens substrate with straight light control portions according to the invention, it is preferable that the specific gravity of the straight light control agent is in the range of 0.7 to 3.0 g/cm$^3$.

This makes it possible to form the straight light control portions more easily. Further, it is possible to improve the productivity of the lens substrate with straight light control portions.

In the method of manufacturing the lens substrate with straight light control portions according to the invention, it is preferable that the step of forming the plurality of convex lenses each having a straight light control portion includes the step of bringing a liquid including at least the straight light control agent into contact with the vicinity of the apex of each of the convex lenses.

This makes it possible to form the straight light control portions more easily.

In the method of manufacturing the lens substrate with straight light control portions according to the invention, it is preferable that the straight light control portion is formed of an adhesive and the straight light control agent.

This makes it possible to further improve the productivity of the lens substrate with straight light control portions because it is easy to dry the adhesive compared with a method using a solvent.

In the method of manufacturing the lens substrate with straight light control portions according to the invention, it is preferable that the step of forming the plurality of convex lenses each having a straight light control portion includes the steps of:

applying the adhesive to the vicinity of the apex of each of the convex lenses; and applying the straight light control agent onto the adhesive.

This makes it possible to further improve the productivity of the lens substrate with straight light control portions because it is easy to dry the adhesive compared with a method using a solvent. Further, the method described above is preferable in view of saving energy and saving resource.

In the method of manufacturing the lens substrate with straight light control portions according to the invention, it is preferable that each of the convex lenses is formed into a microlens.

This makes it possible to provide a microlens substrate having excellent angle of view characteristics.

In the method of manufacturing the lens substrate with straight light control portions according to the invention, it is preferable that, in the case where the average diameter of the microlenses and the average diameter of the straight light control portions are respectively defined as D and d when viewed from the apex of the lens substrate, then D and d satisfy the relation: $1 \leq D/d \leq 50$.

By satisfying the above relations, it is possible to reduce the difference of luminous intensity in accordance with an angle of view sufficiently while keeping light use efficiency, the amount of the transmitted light, and the like as a whole effectively. As a result, it is possible to improve the angle of view characteristics more effectively.

In the method of manufacturing the lens substrate with straight light control portions according to the invention, it is preferable that the average thickness of the straight light control portions in the vicinity of the apex of each convex lens is in the range of 0.5 to 500 μm.

This makes it possible to reduce the difference of luminous intensity in accordance with an angle of view sufficiently while keeping the light use efficiency, the amount of the transmitted light, and the like as a whole effectively. As a result, it is possible to improve the angle of view characteristics more effectively.

In the method of manufacturing the lens substrate with straight light control portions according to the invention, it is preferable that the average diameter d of the straight light control portions is in the range of 10 to 500 μm.

This makes it possible to reduce the difference of luminous intensity in accordance with an angle of view sufficiently while keeping the light use efficiency, the amount of the transmitted light, and the like as a whole effectively. As a result, it is possible to improve the angle of view characteristics more effectively.

In the method of manufacturing the lens substrate with straight light control portions according to the invention, it is preferable that the average diameter D of the microlenses is in the range of 10 to 500 μm.

This makes it possible to further enhance the productivity of the lens substrate with straight light control portions while maintaining sufficient resolution in the image projected on the screen.

In another aspect of the invention, the present invention is directed to a lens substrate with straight light control portions. The lens substrate with straight light control portions manufactured using the method as mentioned above.

This makes it possible to provide a lens substrate with straight light control portions having excellent angle of view characteristics.

Further, a lens substrate with straight light control portions of the invention includes:

a lens substrate provided with a plurality of convex lenses on a surface thereof; and a plurality of straight light control portions for controlling the ratio of straight light in the light entering each of the plurality of convex lenses, each of the straight light control portions being provided in the vicinity of the apex of each of the convex lenses.

This makes it possible to reduce the difference of luminous intensity in accordance with an angle of view sufficiently, and as a result it is possible to improve the angle of view characteristics.

In the lens substrate with straight light control portions according to the invention, it is preferable that each of the convex lenses is formed into a microlens.

This makes it possible to provide a microlens substrate having excellent angle of view characteristics.

In the lens substrate with straight light control portions according to the invention, it is preferable that, in the case where the average diameter of the microlenses and the average diameter of the straight light control portions are respectively defined as D and d when viewed from the apex of the lens substrate, then D and d satisfy the relation: $1 \leq D/d \leq 50$.

By satisfying the above relations, it is possible to reduce the difference of luminous intensity in accordance with an angle of view sufficiently while keeping light use efficiency, the amount of the transmitted light, and the like as a whole effectively. As a result, it is possible to improve the angle of view characteristics more effectively.

In the lens substrate with straight light control portions according to the invention, it is preferable that each of the straight light control portions is formed on the outer surface of each of the microlenses and in the vicinity of the apex of each of the microlenses.

In the case where the lens substrate with straight light control portions has such a structure, it is possible to form the straight light control portions easily. Further, for example, it is possible to arbitrarily adjust the size or the like of the straight light control portion in accordance with a purpose of use or the like of the microlens substrate. Moreover, it is possible to treat various-kind and small-lot production easily.

In the lens substrate with straight light control portions according to the invention, it is preferable that each of the straight light control portions is formed on the inside of each of the microlenses and in the vicinity of the apex of each of the microlenses.

This makes it possible to adjust the shape of each of the straight light control portions easily. Further, since the straight light control portion is formed so as to be integrated with the corresponding microlens, the microlens substrate has superior strength, and there is an advantage that a defect such as separation of a straight light control portion hardly occurs.

In the lens substrate with straight light control portions according to the invention, it is preferable that the average thickness of the straight light control portions in the vicinity of the apex of each convex lens is in the range of 0.5 to 500 µm.

This makes it possible to reduce the difference of luminous intensity in accordance with an angle of view sufficiently while keeping the light use efficiency, the amount of the transmitted light, and the like as a whole effectively. As a result, it is possible to improve the angle of view characteristics more effectively.

In the lens substrate with straight light control portions according to the invention, it is preferable that the straight light control portions are formed of a material containing a particulate straight light control agent, and the average grain diameter of the straight light control agent is in the range of 0.1 to 200 µm.

This makes it possible to further improve the angle of view characteristics while keeping the light use efficiency at a high level as a whole.

In still another aspect of the invention, the present invention is directed to a transmission screen. The transmission screen of the invention includes the lens substrate with straight light control portions of the invention defined as mentioned above.

This makes it possible to provide a transmission screen having excellent angle of view characteristics because a difference of luminous intensity depending on the view angle is reduced sufficiently.

It is preferable that the transmission screen of the invention further includes a Fresnel lens portion with a plurality of Fresnel lenses, the Fresnel lens portion having an emission face and the plurality of Fresnel lenses being formed in the emission face wherein the lens substrate with straight light control portions is arranged on the side of the emission face of the Fresnel lens portion.

This makes it possible to provide a transmission screen having excellent angle of view characteristics because a difference of luminous intensity depending on the view angle is reduced sufficiently.

In yet still another aspect of the invention, the present invention is directed to a rear projection. The rear projection of the invention includes the transmission screen of the invention defined as mentioned above.

This makes it possible to provide a rear projection provided with the transmission screen which has a high display quality.

It is preferable that the rear projection of the invention further includes:

a projection optical unit; and a light guiding mirror.

This makes it possible to provide a rear projection provided with the transmission screen which has a high display quality.

BRIEF DESCRIPTION OF THE DRAWINGS

The foregoing and other objects, features and advantages of the present invention will become more readily apparent from the following detailed description of preferred embodiments of the invention which proceeds with reference to the accompanying drawings.

DETAILED DESCRIPTION OF THE INVENTION

A detailed description will now be given for a method of manufacturing a lens substrate with straight light control portions, a lens substrate with straight light control portions, a transmission screen and a rear projection provided with the lens substrate with straight light control portions of the preferred embodiments according to the present invention with reference to the accompanying drawings.

First Embodiment

First, the constitutions of the lens substrate with straight light control portions and the transmission screen of the present invention will now be described.

Figure 1:
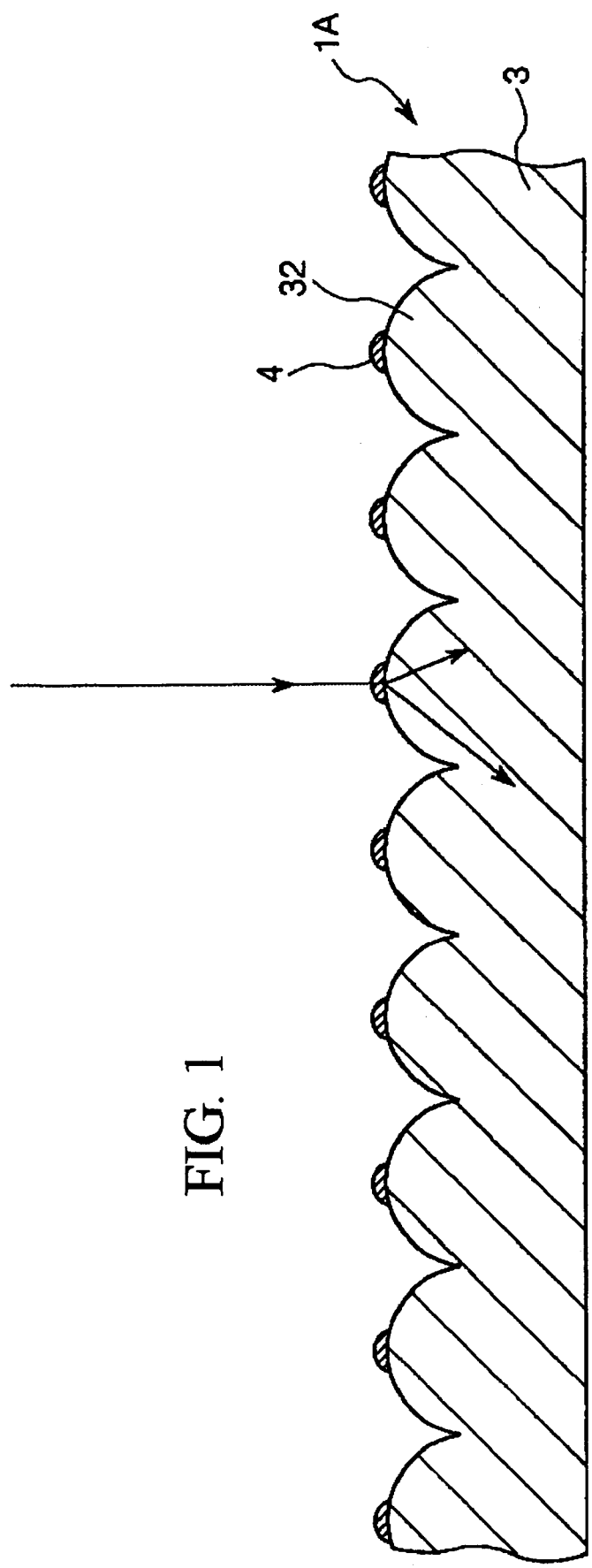
FIG. 1 is a schematic longitudinal cross-sectional view showing a lens substrate with straight light control portions in a first embodiment according to the present invention.
Figure 2:
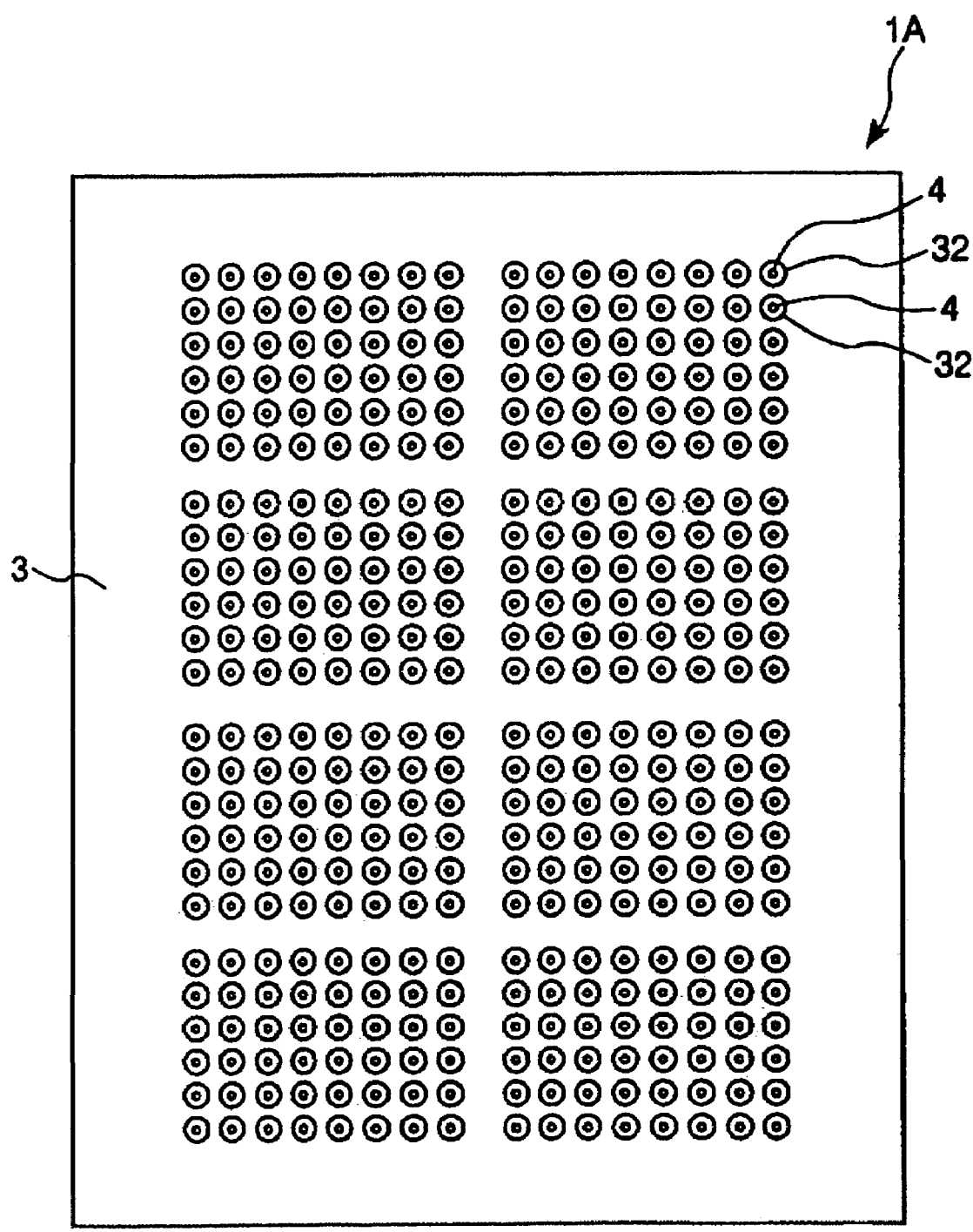
FIG. 2 is a plan view showing a microlens substrate with which the lens substrate with straight light control portions shown in FIG. 1 is provided.
Figure 3:
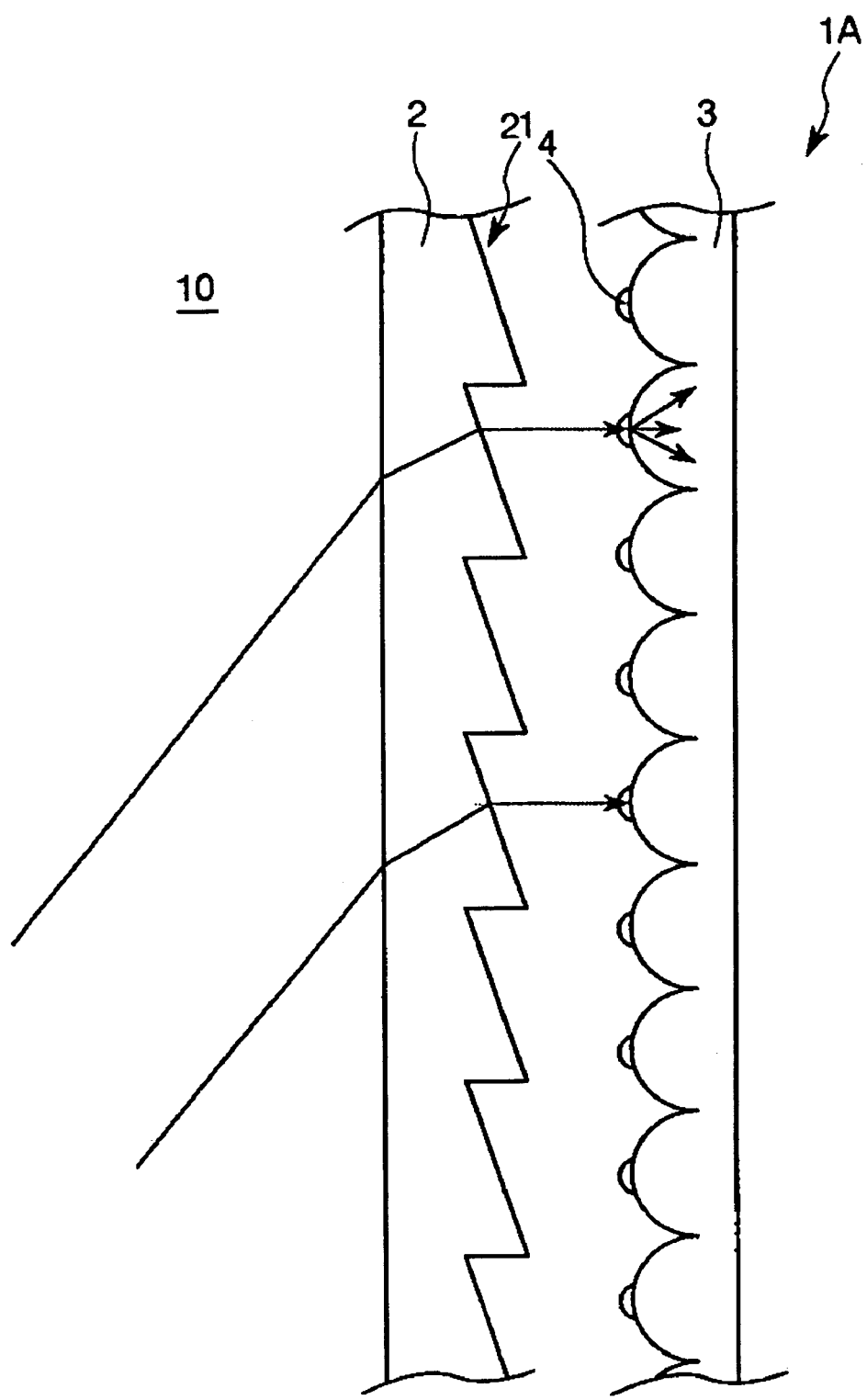
FIG. 3 is a schematic longitudinal cross-sectional view showing a transmission screen provided with the lens substrate with straight light control portions shown in FIG. 1 in a first embodiment according to the present invention.

FIG. 1 is a schematic longitudinal cross-sectional view showing a lens substrate with straight light control portions in a first embodiment according to the present invention. FIG. 2 is a plan view showing a microlens substrate with which the lens substrate with straight light control portions shown in FIG. 1 is provided. FIG. 3 is a schematic longitudinal cross-sectional view showing a transmission screen provided with the lens substrate with straight light control portions shown in FIG. 1 in a first embodiment according to the present invention. In this regard, in the following description, the left sides and right sides in FIGS. 1 and 3 are referred to as a "light incident side (or light incident face)" and a "light emission side (or light emission face)", respectively.

A lens substrate with straight light control portions 1A is a member constituting a transmission screen 10 described later. As shown in FIG. 1, the lens substrate with straight light control portions 1A includes: a microlens substrate (lens substrate) 3 having a function of condensing incident light; and a plurality of straight light control portions 4 each having a function of controlling the ratio of straight light in incident light to the microlens substrate 3.

The microlens substrate 3 has a light incident face and a light emission face opposite to the light incident face. Further, the microlens substrate 3 has a large number of microlenses (lens portions) 32 formed on the light incident face of the microlens substrate 3 (that is, the surface of an incident side of the resin layer 31). The microlens substrate 3 is mainly constituted from resin material that is transparent with a predetermined index of refraction.

It is preferable that the average diameter D of the microlenses 32 is in the range of 10 to 500 μm, and more preferably it is in the range of 30 to 300 μm, and further more preferably it is in the range of 50 to 100 μm. By restricting the average diameter D of the microlenses 32 in the above ranges, it is possible to further enhance the productivity of the lens substrate with straight light control portions 1A (transmission screen 10) while maintaining sufficient resolution in the image projected on the screen. In this regard, it is preferable that the pitch between adjacent microlenses 32 in the microlens substrate 3 is in the range of 10 to 500 μm, more preferably the pitch is in the range of 30 to 300 μm, and further more preferably the pitch is in the range of 50 to 100 μm.

Further, it is preferable that curvature radius of each of the plurality of microlenses 32 is in the range of 5 to 250 μm, and more preferably it is in the range of 25 to 50 μm. By restricting the curvature radius of each of the microlenses 32 in the above ranges, it is possible to enlarge both distributions of vertical and lateral view angles. As a result, it is possible to improve the angle of view characteristics more effectively.

Moreover, an arrangement pattern of the microlenses 32 is not particularly limited. The arrangement pattern may be either an arrangement pattern in which the microlenses 32 are arranged in a regular manner as shown in FIG. 2 or an arrangement pattern in which the microlenses 32 are arranged in an optically random manner (the microlenses 32 are randomly arranged when viewed from the top of the light incident face of the microlens substrate 3 (when viewed from a major surface of the lens substrate with straight light control portions 1A)). By arranging the microlenses 32 in a random manner, it is possible to effectively prevent interference of a light valve of a liquid crystal or the like and a Fresnel lens, and therefore it is possible to prevent occurrence of moire almost completely. This makes it possible to obtain an excellent transmission screen 10 having a high display quality. In this regard, a term "in an optically random order" in the specification means that a plurality of microlenses 32 are arranged irregularly or at random so that it is possible to prevent and suppress occurrence of optical interference such as moire sufficiently.

Meanwhile, although a conventional microlens substrate have had a feature that distribution of vertical and lateral view angles is sufficiently large, it was difficult to obtain sufficient view angle characteristics because a difference of luminous intensity became larger in accordance with an angle of view (that is, a view angle). The inventor of the present invention found that it is possible to reduce a difference of luminous intensity depending on the view angle sufficiently by providing a straight light control portion on the vicinity of the apex of each microlens (convex lens) and thereby controlling (or restraining) the straight light that passes through the vicinity of the apex of each microlens, and as a result it is possible to improve the angle of view characteristics.

In the present embodiment, as shown in FIG. 1, each of the straight light control portions 4 is formed on the outer surface of each of the microlenses 32 and in the vicinity of the apex of each of the microlenses 32. In the case where the lens substrate with straight light control portions 1A has such a structure, it is possible to form the straight light control portions 4 easily. Further, for example, it is possible to arbitrarily adjust the size or the like of the straight light control portion 4 in accordance with a purpose of use or the like of the microlens substrate. Moreover, it is possible to treat various-kind and small-lot production easily.

In the present embodiment, the straight light control portions 4 are mainly made of a light diffusion agent (straight light control agent) that has a function of diffusing light. In the case where the straight light control portion 4 is formed of the straight light control agent in this manner, it is possible to control the straight light passing through the vicinity of the apex of the microlenses 32 while keeping light use efficiency, the amount of the transmitted light, and the like as a whole effectively. As a result, it is possible to reduce the difference of luminous intensity in accordance with an angle of view sufficiently, and this makes it possible to improve the angle of view characteristics. In particular, by constituting the straight light control portion 4 from the light diffusion agent, it is possible to improve the luminous intensity of the lens substrate with straight light control portions when viewed from an oblique direction thereof, while preventing the luminous intensity when viewed from the top thereof compared with a conventional lens substrate. As a result, it is possible to improve the angle of view characteristics more effectively.

The light diffusion agent is not particularly limited. Silica, glass, resin or the like in the form of particulates (beads) can be used as the diffusion media 51, for example. It is preferable that the average grain diameter of such a light diffusion agent (straight light control agent) is in the range of 0.1 to 200 μm, and more preferably it is in the range of 1.0 to 20 μm. This makes it possible to further improve the angle of view characteristics while keeping the light use efficiency at a high level as a whole.

It is preferable that, in the case where the average diameter of the microlenses 32 and the average diameter of the straight light control portions 4 are respectively defined as D and d when viewed from the top of the lens substrate with straight light control portions 1A, then D and d satisfy the relation: $1 \leq D/d \leq 50$, and more preferably they satisfy the relation: $1.2 \leq D/d \leq 5$. By satisfying the above relations, it is possible to reduce the difference of luminous intensity in accordance with an angle of view sufficiently while keeping light use efficiency, the amount of the transmitted light, and the like as a whole effectively. As a result, it is possible to improve the angle of view characteristics more effectively. If D/d is below the lower limit given above, it may be difficult to keep the luminous intensity of the whole microlens substrate 3 sufficiently. On the other hand, if D/d is over the upper limit given above, it may be difficult to reduce the ratio of the straight light sufficiently, and as a result it may be difficult to reduce the difference of luminous intensity in accordance with the view angle.

It is preferable that the average diameter d of the straight light control portions 4 is in the range of 10 to 500 μm, and more preferably it is in the range of 20 to 100 μm. This makes it possible to reduce the difference of luminous intensity in accordance with an angle of view sufficiently while keeping light use efficiency, the amount of the transmitted light, and the like as a whole effectively. As a result, it is possible to improve the angle of view characteristics more effectively. If the average diameter d is below the lower limit given above, it may be difficult to reduce the ratio of the straight light sufficiently, and as a result it may be difficult to reduce the difference of luminous intensity in accordance with the view angle. On the other hand, if the average diameter d is over the upper limit given above, it may be difficult to keep the light use efficiency, the amount of the transmitted light, and the like as a whole effectively.

Further, it is preferable that the average thickness of the straight light control portions 4 in the vicinity of the apex of each convex lens 32 is in the range of 0.5 to 500 μm, and more preferably it is in the range of 1.0 to 20 μm. This makes it possible to reduce the difference of luminous intensity in accordance with an angle of view sufficiently while keeping the light use efficiency, the amount of the transmitted light, and the like as a whole effectively. As a result, it is possible to improve the angle of view characteristics more effectively.

The straight light control portions 4 as described above may be formed by a method described later, for example.

The case of using the light diffusion agent as the straight light control agent has been described above. However, a light shielding agent that has a function of reducing the amount of transmitted light as the whole microlens substrate 3 may be used as the straight light control agent in place of the light diffusion agent. The light shielding agent may be one that reduces the amount of transmitted light by absorbing the incident light, or one that reduces the amount of transmitted light by reflecting the incident light.

By forming the straight light control portions 4 using the light shielding agent, it is possible to control the ratio of the straight light in the incident light to the microlenses 32 more effectively. As a result, it is possible to reduce the difference of luminous intensity in accordance with an angle of view sufficiently, and this makes it possible to improve the angle of view characteristics more effectively. In the case of using the light shielding agent as the straight light control agent, black resist, ink or the like can be used as the light shielding agent.

Further, in the case of using the light shielding agent as the straight light control agent, it is preferable that, in the case where a transmission ratio of light of the straight light control portion is defined as $X_1(\%)$ and a transmission ratio of light in the case of not containing the straight light control agent in the straight light control portion is defined as $X_2(\%)$, then $X_1$ and $X_2$ satisfy the relation: $0.1 \leq X_1/X_2 \leq 1.0$, and more preferably they satisfy the relation: $0.5 \leq X_1/X_2 \leq 0.9$. This makes it possible to control the ratio of the straight light in the light entering each of the microlenses 32 more effectively. As a result, it is possible to reduce the difference of luminous intensity in accordance with an angle of view sufficiently, and this makes it possible to improve the angle of view characteristics more effectively. In this regard, in addition to the light diffusion agent or the light shielding agent described above, the straight light control portions 4 may contain a mixture of the light diffusion agent and the light shielding agent, adhesive, various kinds of additives or the like.

Next, a transmission screen 10 provided with the lens substrate with straight light control portions 1A described above will be described.

As shown in FIG. 3, the transmission screen 10 is provided with a Fresnel lens portion 2 and the lens substrate with straight light control portions 1A described above. The Fresnel lens portion 2 is arranged on the side of the light incident face of the lens substrate with straight light control portions 1A (that is, on the incident side of light for an image), and the light that has been transmitted by the Fresnel lens portion 2 enters the lens substrate with straight light control portions 1A.

The Fresnel lens portion 2 is provided with a Fresnel lens 21 in which a plurality of prisms are formed on a light emission face of the Fresnel lens portion 2 in a substantially concentric manner. The Fresnel lens portion 2 deflects the light for a projected image from a projection lens (not shown in the drawings), and outputs parallel light La that is parallel to the perpendicular direction of the major surface of the lens substrate with straight light control portions 1A to the side of the light incident face of the lens substrate with straight light control portions 1A.

In the transmission screen 10 constructed as described above, the light from the projection lens is deflected by the Fresnel lens portion 2 to become the parallel light La. Then, the parallel light La enters the microlens substrate 3 to be condensed by each of the microlenses 32 of the microlens substrate 3, and the condensed light is diffused, whereby an observer (viewer) of the transmission screen 10 observes (watches) the light as a flat image.

Meanwhile, the light entering the vicinity of the apex of each microlens 32 generally outputs from the microlens substrate 3 as straight light. However, since the straight light control portion 4 mainly constituted from the light diffusion agent is formed in the vicinity of the apex of each microlens 32, the light entering the vicinity of the apex of each microlens 32 is diffused by the straight light control portion 4. As a result, it is possible to reduce the difference of luminous intensity in accordance with an angle of view sufficiently, and the transmission screen 10 can have excellent angle of view characteristics.

Next, an example of a method of manufacturing the lens substrate with straight light control portions 1A described above will be described.

Figure 5A:
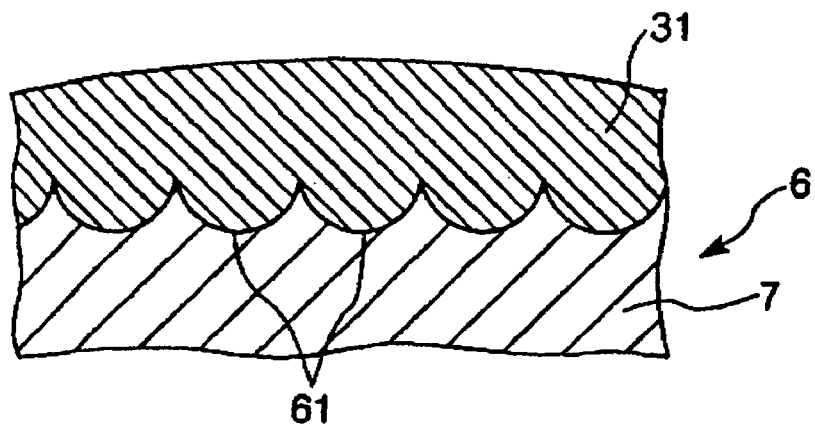
FIG. 5 is a schematic longitudinal cross-sectional view showing an example of a method of manufacturing the lens substrate with straight light control portions shown in FIG. 1.
Figure 5B:
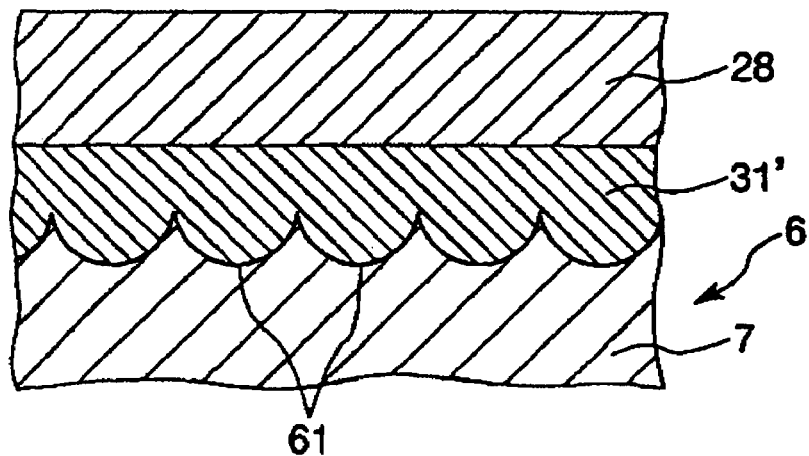
Figure 5C:
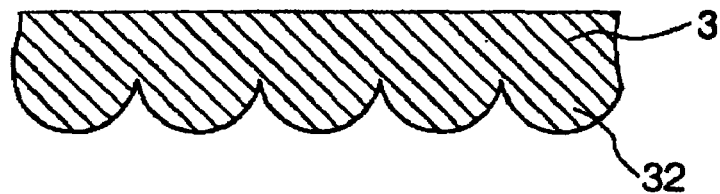
Figure 6A:
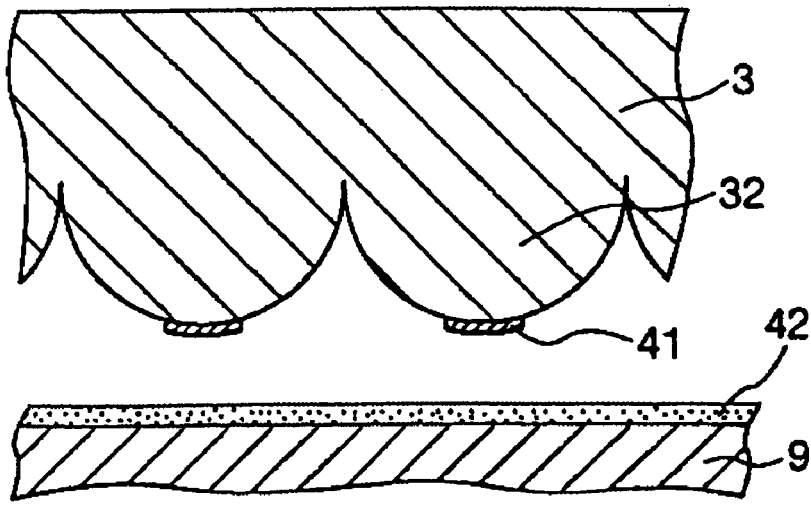
FIG. 6 is a schematic longitudinal cross-sectional view showing an example of a method of manufacturing the lens substrate with straight light control portions shown in FIG. 1.
Figure 6B:
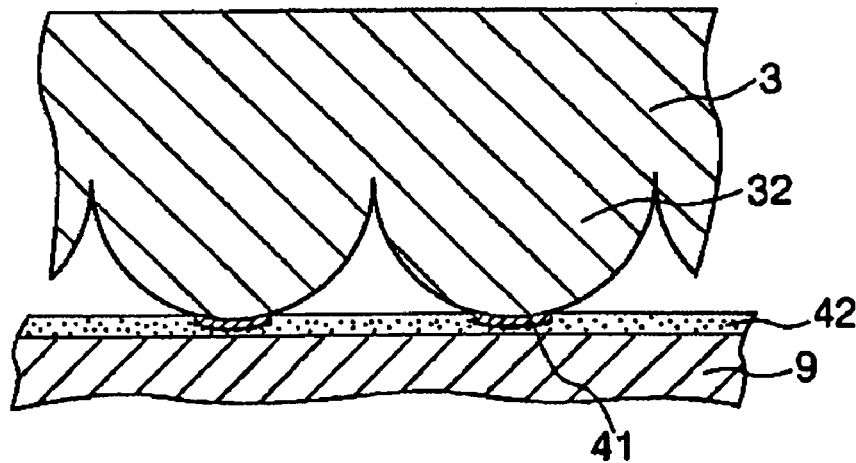
Figure 6C:
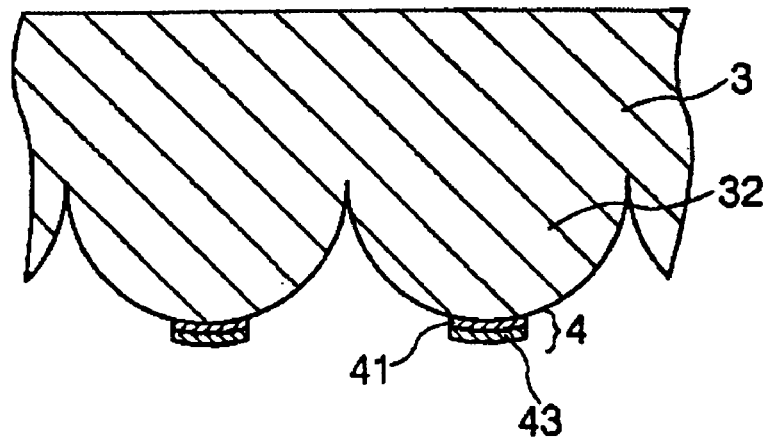

FIGS. 4-6 are schematic longitudinal cross-sectional views each showing an example of a method of manufacturing the lens substrate with straight light control portions shown in FIG. 1. In this regard, in the following description, the lower sides and upper sides in FIGS. 4-6 are referred to as a "light incident side (or light incident face)" and a "light emission side (or light emission face)", respectively. A method of manufacturing a lens substrate with straight light control portions according to the present invention has a feature that the method including the steps of: preparing a substrate having a plurality of concave portions on one surface thereof; forming a lens substrate (microlens substrate) having a plurality of convex lenses (microlenses) 32 using the substrate having the plurality of concave portions; and forming a straight light control portion on the apex of each of the plurality of convex lenses 32.

In this regard, although a large number of convex lenses 32 are actually formed on the substrate in the step of forming the lens substrate with straight light control portions, only a part of them will be exaggeratedly shown in order to simplify the explanation thereof.

First, a description will be given for a method of manufacturing a substrate with concave portions used for a method of manufacturing a lens substrate with straight light control portions of the present invention. For example, the substrate with for a method of manufacturing a lens substrate with straight light control portions of the present invention concave portions used can be manufactured as follows.

Manufacturing of a Substrate 6 with Concave Portions

First, the substrate 7 is prepared in manufacturing a substrate 6 with concave portions. It is preferable that a substrate having a uniform thickness without flexure and blemishes is used for the substrate 7. Further, it is also preferable that a substrate with a surface cleaned by washing or the like is used for the substrate 7. Although soda-lime glass, crystalline glass, quartz glass, lead glass, potassium glass, borosilicate glass, alkali-free glass or the like may be mentioned as the material for the substrate 7, soda-lime glass and crystalline glass (for example, neoceram or the like) are preferable among them. By the use of soda-lime glass, crystalline glass or alkali-free glass, it is easy to process the material for the substrate 5, and it is advantageous from the viewpoint of manufacturing cost because soda-lime glass or crystalline glass is relatively inexpensive.

Figure 4A:
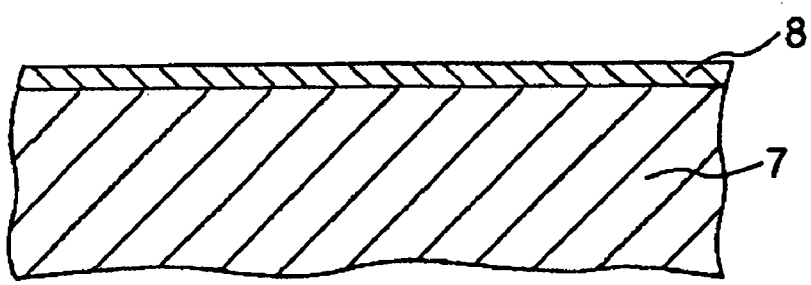
FIG. 4 is a schematic longitudinal cross-sectional view showing an example of a method of manufacturing the lens substrate with straight light control portions shown in FIG. 1.

<A1> As shown in FIG. 4A, a mask 8 is formed on the surface of the prepared substrate 7 (mask formation process). It is preferable that the mask 8 permits initial holes 81 described later to be formed therein by means of irradiation with laser beams or the like, and has resistance to an etching process (described later). In other words, it is preferable that the mask 8 is constituted such that it has an etching rate nearly equal to or smaller than that of the substrate 7.

From such a viewpoint, for example, metals such as Cr, Au, Ni, Ti, Pt, and the like, alloys containing two or more kinds selected from these metals, oxides of these metals (metal oxides), silicon, resins, or the like may be mentioned as the material for the mask 8. Alternatively, the mask 8 may be given a laminated structure by a plurality of layers formed of different materials such as a Cr/Au or chromium oxide/Cr laminate. The method of forming the mask 8 is not particularly limited. In the case where the mask 8 is constituted from metal materials (including alloy) such as Cr and Au or metal oxides such as chromium oxide, the mask 8 can be suitably formed by evaporation method, sputtering method, or the like, for example. On the other hand, in the case where the mask 8 is formed of silicon, the mask 8 can be suitably formed by sputtering method, CVD method, or the like, for example.

Although the thickness of the mask 8 also varies depending upon the material constituting the mask 8, it is preferable to be in the range of 0.01 to 2.0 μm, and more preferably it is in the range of 0.03 to 0.2 μm. If the thickness is below the lower limit given above, there is a possibility to deform shapes of the initial holes 81 formed in the initial hole formation process described later. In addition, there is a possibility that sufficient protection for the masked portion of the substrate 7 cannot be obtained during a wet etching process in the etching step (described later). On the other hand, if the thickness is over the upper limit given above, in addition to the difficulty in formation of the initial holes 81 that penetrate in the initial hole formation process (described later), there will be a case in which the mask 8 tends to be easily removed due to internal stress of the mask 8 depending upon the constituent material or the like of the mask 8.

Figure 4B:
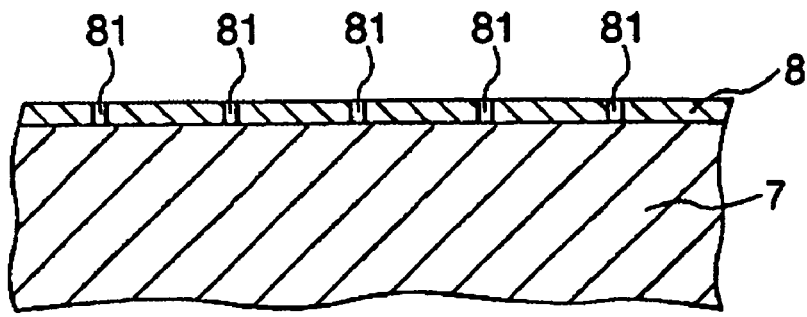

<A2> Subsequently, as shown in FIG. 4B, the plurality of initial holes 81 that will be utilized as mask openings in the etching (described later) are formed in the mask 8 at random by means of the physical method or the irradiation with laser beams (initial hole formation process). The initial holes 81 may be formed in any method, but it is preferable that the initial holes 61 are formed by the physical method or the irradiation with laser beams. This makes it possible to manufacture the microlenses substrate, for example, at high productivity. In particular, the concave portions can be easily formed on a relatively large-sized substrate.

The physical methods of forming the initial holes 81 includes such methods as, for example, blast processing such as shot blast, sand blast or the like, etching, pressing, dot printing, tapping, rubbing, or the like. In the case where the initial holes 81 are formed by means of the blast processing, it is possible to form the initial holes 81 with high efficiency in a shorter time even for a substrate 7 with a relatively large area (that is, area of the region for formation of microlenses 32).

Further, in the case where the initial holes 81 are formed by means of irradiation with laser beams, the kind of laser beams to be used is not particularly limited, but a ruby laser, a semiconductor laser, a YAG laser, a femtosecond laser, a glass laser, a $YVO_4$ laser, a Ne—He laser, an Ar laser, a carbon dioxide laser, an excimer laser or the like may be mentioned. Further, a waveform of a laser such as SHG (second-harmonic generation), THG (third-harmonic generation), FHG (fourth-harmonic generation) or the like may be utilized. In the case where the initial holes 81 are formed by means of the irradiation of laser beams, it is possible to easily and precisely control the size of the initial holes 81, distance between adjacent initial holes 81, or the like. It is preferable that the initial holes 81 are formed uniformly on the entire surface of the mask 8.

Figure 4C:
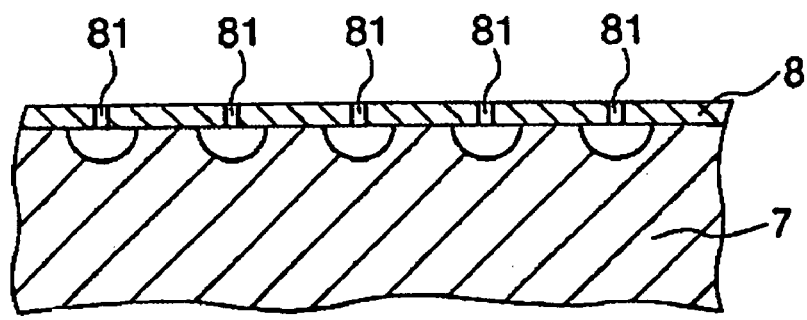

<A3> Subsequently, as shown in FIG. 4C, a large number of concave portions 61 are randomly formed on the substrate 7 by applying the etching process to the substrate 7 using the mask 8 in which the initial holes 81 are formed (etching process). The etching method is not particularly limited, and a wet etching process, a dry etching process or the like may be mentioned as an example. In the following explanation, the case of using the wet etching process will be described as an example.

Figure 4D:
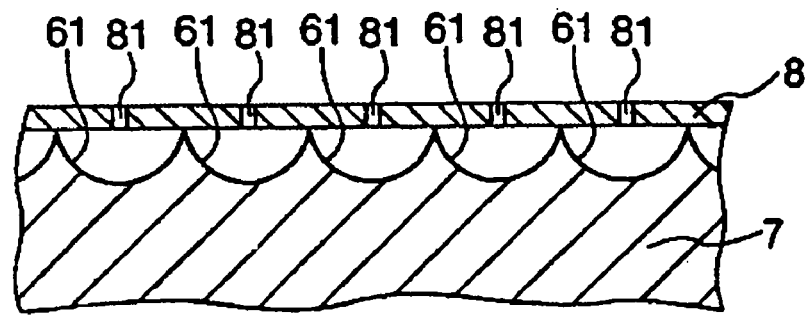

By applying the wet etching process to the substrate 7 covered with the mask 8 in which the initial holes 81 are formed, as shown in FIG. 4C, the substrate 7 is eroded from the portions where no mask 8 is present, whereby a large number of concave portions 61 are formed on the substrate 7 as shown in FIG. 4D. The formation of the concave portions 61 can be carried out suitably by employing the wet etching process in this way. In the case where an etchant containing hydrofluoric acid (hydrogen fluoride) (that is, hydrofluoric acid-based etchant) is utilized for an etchant, for example, the substrate 7 can be eroded more selectively, and this makes it possible to form the concave portions 61 suitably.

Figure 4E:
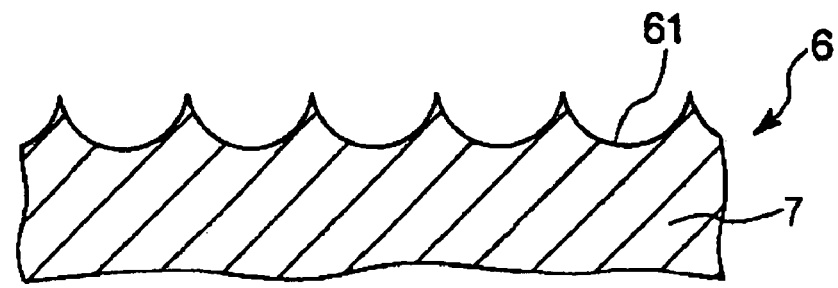

<A4> Subsequently, the mask 8 is removed as shown in FIG. 4E (mask removal process). The mask 8 can be removed by etching or the like, for example. As a result of the processing in the above, as shown in FIG. 4D, a substrate 6 with concave portions having a large number of concave portions 61 is obtained.

Next, a description will be given for an example of a method of manufacturing the lens substrate with straight light control portions 1A using the substrate 6 with concave portions as described above.

Step of Forming Lens Substrate 3

<B1> First, as shown in FIG. 5A, an uncured resin material 31 having a predetermined index of refraction is applied onto the substrate 6 with concave portions to fulfill the resin material 31 in the concave portions 61.

<B2> Subsequently, as shown in FIG. 5B, a transparent substrate 28 is joined to the resin material 31 so that the transparent substrate 29 is closely contacted with the resin material 31 by pressing. In this regard, a mold-releasing agent or the like, for example, may be applied to the inner surface of the concave portions 61 that are to be in contact with the resin material 31.

<B3> Subsequently, the resin material 31 is cured. The method of curing the resin material 31 is appropriately selected according to the kind of the resin, and for example, ultraviolet irradiation, heating, electron beam irradiation, or the like may be mentioned. In this way, a resin layer 31' is formed between the transparent substrate 28 and the substrate 6 with concave portions.

<B4> Subsequently, as shown in FIG. 5C, the transparent substrate 28 and the substrate 6 with concave portions are removed from the resin layer 31'. In this way, a lens substrate 3 provided with a plurality of convex lenses (microlenses) 32 is obtained. In this case, when applying the uncured resin material 31 onto the substrate 6 with concave portions, spacers may be included in the resin material 31. this makes it possible to define the thickness of the lens substrate 3 with high accuracy, and it is possible to prevent unevenness of the thickness of each of the lens substrate 3 and the resin layer 31' suitably.

Step of Forming Straight Light Control Portions 4

<C1> A method of forming the straight light control portions 4 is not particularly limited, and in the present embodiment, as shown in FIG. 6A, an adhesive layer 41 is first formed by applying an adhesive in the vicinity of the apex of each microlens 32. The method of applying the adhesive onto the apex of each microlens 32 is not particularly limited. For example, a doctor blade method, a spin coat method, a blush coat method, and various types of coating methods such as a spray coating, an electrostatic coating, an electrodeposition coating, roll coater and the like, and a dipping may be mentioned. Such an adhesive is not particularly limited as long as the straight light control agent described above can be joined to the vicinity of the apex of the each microlens 32. Any one of various kinds of thermosetting adhesives, various kinds of thermoplastic adhesives, various kinds of photosensitive adhesives, and the like, for example, can be utilized.

<C2> Subsequently, a flat substrate provided with a dispersed layer 42 in which the straight light control agent is evenly dispersed on the surface thereof is prepared, and as shown in FIG. 6A, the adhesive layer 41 and the dispersed layer 42 are placed so as to face each other.

<C3> Subsequently, as shown in FIG. 6B, the adhesive layer 41 is bonded to the dispersed layer 42, and the straight light control agent is transferred onto the adhesive layer 41 from the dispersed layer 42, whereby a straight light control agent layer 43 is formed.

<C4> Subsequently, processing such as heat treatment (for example, heating, cooling or the like), light irradiation, reduction of pressure of the atmosphere, or the like is applied to the microlens substrate 3 with the straight light control agent layer 43 to harden (or cure) the adhesive as needed, whereby the straight light control portions 4 constituted from the adhesive layer 41 and the straight light control agent layer 43 is formed. In this manner as described above, the lens substrate with straight light control portions 1A is manufactured. In the case where the method described above is used for forming the straight light control portions 4, it is possible to further improve the productivity of the lens substrate with straight light control portions (or transmission screen) because it is easy to dry the adhesive compared with a method using a solvent described later. Further, the method described above is preferable in view of saving energy and saving resource.

In this regard, although the structure in which the adhesive layer 41 and the straight light control layer 43 are formed so as to be laminated separately is shown in the drawings, such a structure is shown for convenience of explanation, and they may be integrated. Further, the case where the straight light control portions 4 are formed by applying the straight light control agent thereto after the adhesive layer 41 is provided is described in the present embodiment, but the present invention is not limited thereto. For example, a liquid containing the straight light control agent (for example, a mixture of the adhesive and the straight light control agent) may be brought into contact with the vicinity of the apex of each microlens 32 to form the straight light control portions 4. This makes it possible to form the straight light control portions 4 more easily.

The method of bringing the liquid containing such a straight light control agent into contact with the vicinity of the apex of each microlens 32 is not particularly limited. For example, a doctor blade method, a spin coat method, a blush coat method, and various types of coating methods such as a spray coating, an electrostatic coating, an electrodeposition coating, roll coater and the like, and a dipping may be mentioned. Further, coefficient of viscosity of the liquid containing the straight light control agent at about room temperature (for example, 25° C.) is not particularly limited. It is preferable that the coefficient of viscosity of the liquid at this state is in the range of 10 to 1,000 cp, and more preferably it is in the range of 30 to 100 cp. By restricting the coefficient of viscosity of the liquid in the above range, it is possible to form the straight light control portions 4 each having an appropriate thickness easily and surely. Moreover, a solvent, dispersion medium, or the like may be included in the liquid containing the straight light control agent. This makes it possible to become optimum fluidity of the liquid containing the straight light control agent relatively easily.

Second Embodiment

Figure 7:
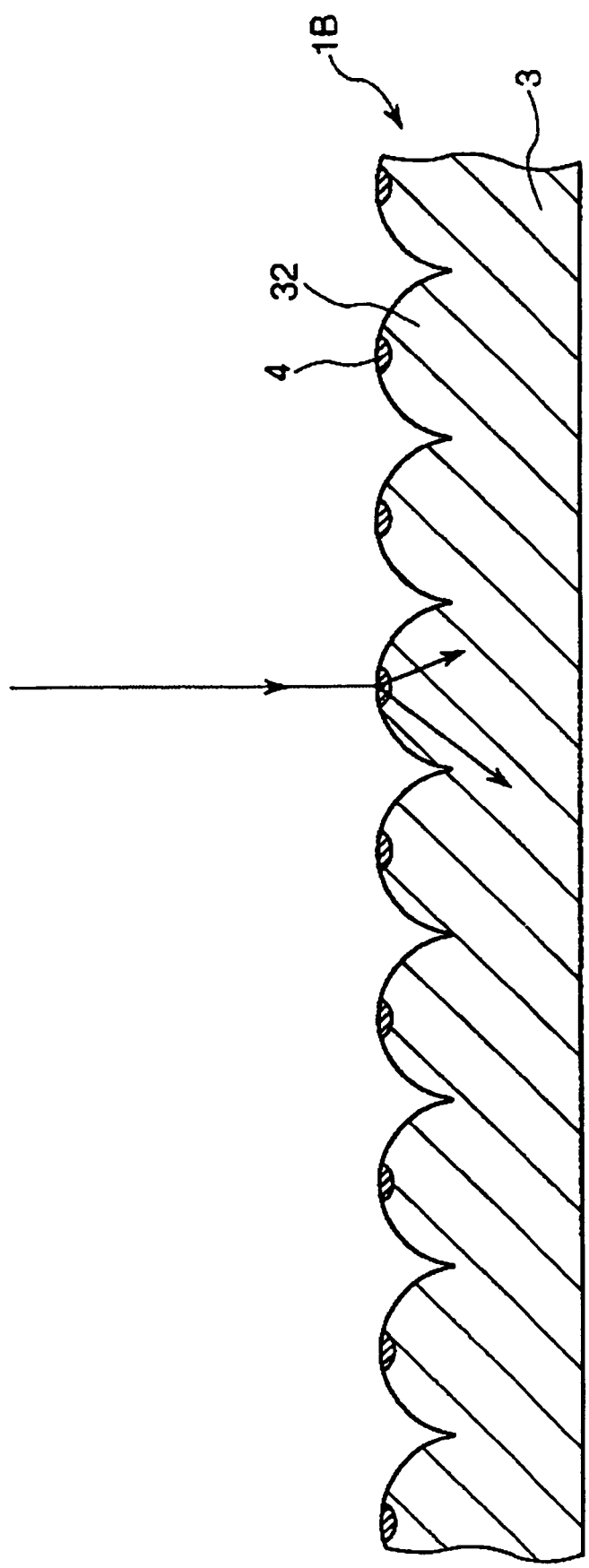
FIG. 7 is a schematic longitudinal cross-sectional view showing a lens substrate with straight light control portions in a second embodiment according to the present invention.

Next, a description will be given for a lens substrate with straight light control portions in a second embodiment according to the present invention. FIG. 7 is a schematic longitudinal cross-sectional view showing a lens substrate with straight light control portions in a second embodiment according to the present invention. In this regard, in the following description, the left side and right side in FIG. 7 are referred to as a "light incident side (or light incident face)" and a "light emission side (or light emission face)", respectively. Further, in the description given below, the focus of the description is on the different points between the first embodiment described above and the second embodiment, and a description of the same parts (points) is omitted.

As shown in FIG. 7, in a lens substrate with straight light control portions 1B of the present embodiment, a straight light control portion 4 is formed in the vicinity of the apex of each of microlenses (convex lens) 32 and inside each microlens (convex lens) 32. By forming the straight light control portion 4 inside of each of the microlenses 32 in the vicinity of the apex thereof in this manner, it is possible to adjust the shape of each of the straight light control portions 4 easily. Further, since the straight light control portion 4 is formed so as to be integrated with the corresponding microlens 32, the microlens substrate 3 has superior strength, and there is an advantage that a defect such as separation of a straight light control portion 4 hardly occurs. Furthermore, by using the lens substrate with straight light control portions 1B of the present embodiment, a transmission screen of the present invention can be obtained as well as in the first embodiment described above.

Next, a description will be given for an example of a method of manufacturing the lens substrate with straight light control portions 1B of the second embodiment. FIG. 8 is a schematic longitudinal cross-sectional view showing an example of a method of manufacturing the lens substrate with straight light control portions shown in FIG. 7.

<D1> First, a substrate 6 with concave portions is prepared as well as in the first embodiment described above.

Figure 8A:
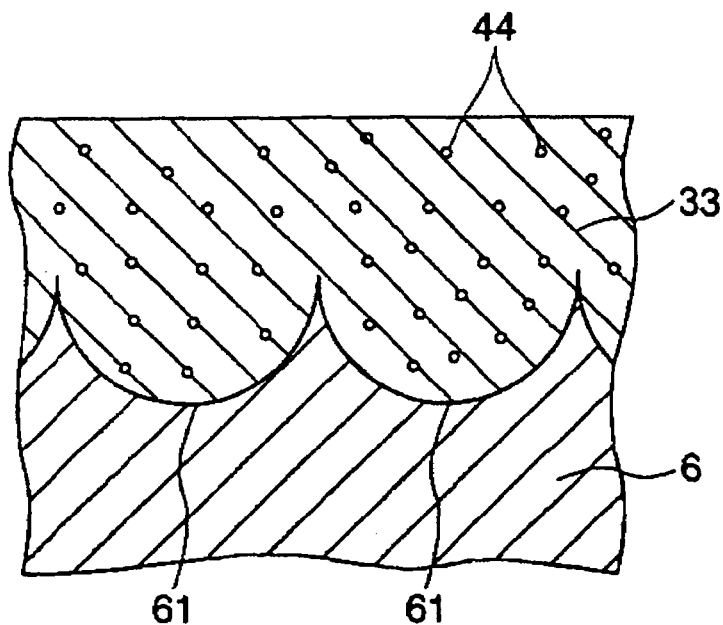
FIG. 8 is a schematic longitudinal cross-sectional view showing an example of a method of manufacturing the lens substrate with straight light control portions shown in FIG. 7.

<D2> Subsequently, as shown in FIG. 8A, an uncured resin material 33 to which a straight light control agent 44 is added is applied (supplied) onto the substrate 6 with concave portions. In this case, the resin material 33 may include any component other than the resin and the straight light control agent 44.

Figure 8B:
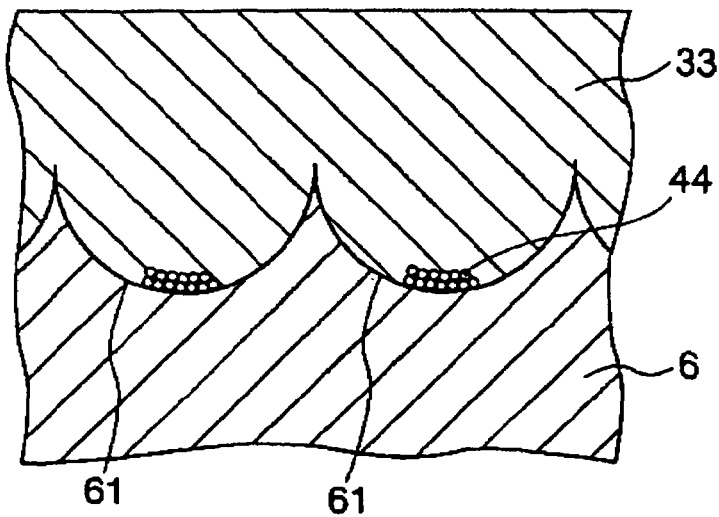

<D3> Subsequently, as shown in FIG. 8B, the straight light control agent 44 is precipitated on the bottom of each of the plurality of concave portions 61, that is, at the vicinity of a portion corresponding to the apex of each microlens 32 to be formed.

<D4> Subsequently, the resin material 33 is hardened (cured). The method of curing the resin material 31 is appropriately selected according to the kind of the resin, and for example, ultraviolet irradiation, heating, electron beam irradiation, or the like may be mentioned. In this way, a microlens substrate 3 provided with a plurality of convex lenses (microlenses) 32 each having the straight light control portion 4 is formed.

Figure 8C:
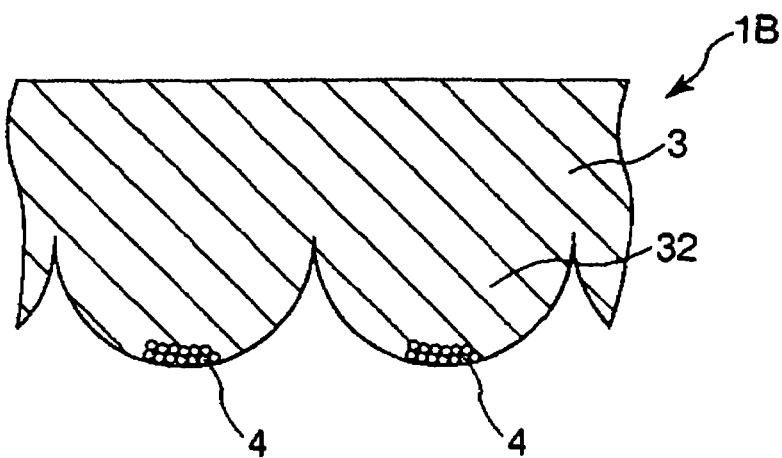

<D5> Subsequently, as shown in FIG. 8C, the substrate 6 with concave portions is removed from the microlens substrate 3. Thus, the lens substrate with straight light control portions 1B can be obtained.

As described above, the lens substrate with straight light control portions 1B of the present embodiment has a feature that the straight light control agent 44 is added to the resin material 33 to be supplied to the substrate 6 with concave portions and precipitated at the vicinity of a portion corresponding to the apex of each microlens 32 to be formed. Thus, it is possible to obtain the lens substrate with straight light control portions 1B more easily. In this regard, it is preferable that the specific gravity of the straight light control agent 44 is larger than that of the resin material 33. More specifically, it is preferable that the specific gravity of the straight light control agent 44 is in the range of 0.7 to 3.0 g/cm$^3$, and more preferably it is in the range of 0.8 to 1.5 g/cm$^3$. This makes it possible to form the straight light control portions 4 more easily. Further, it is possible to improve the productivity of the lens substrate with straight light control portions 1B.

Next, a description will be given for a rear projection using the transmission screen described above.

Figure 9:
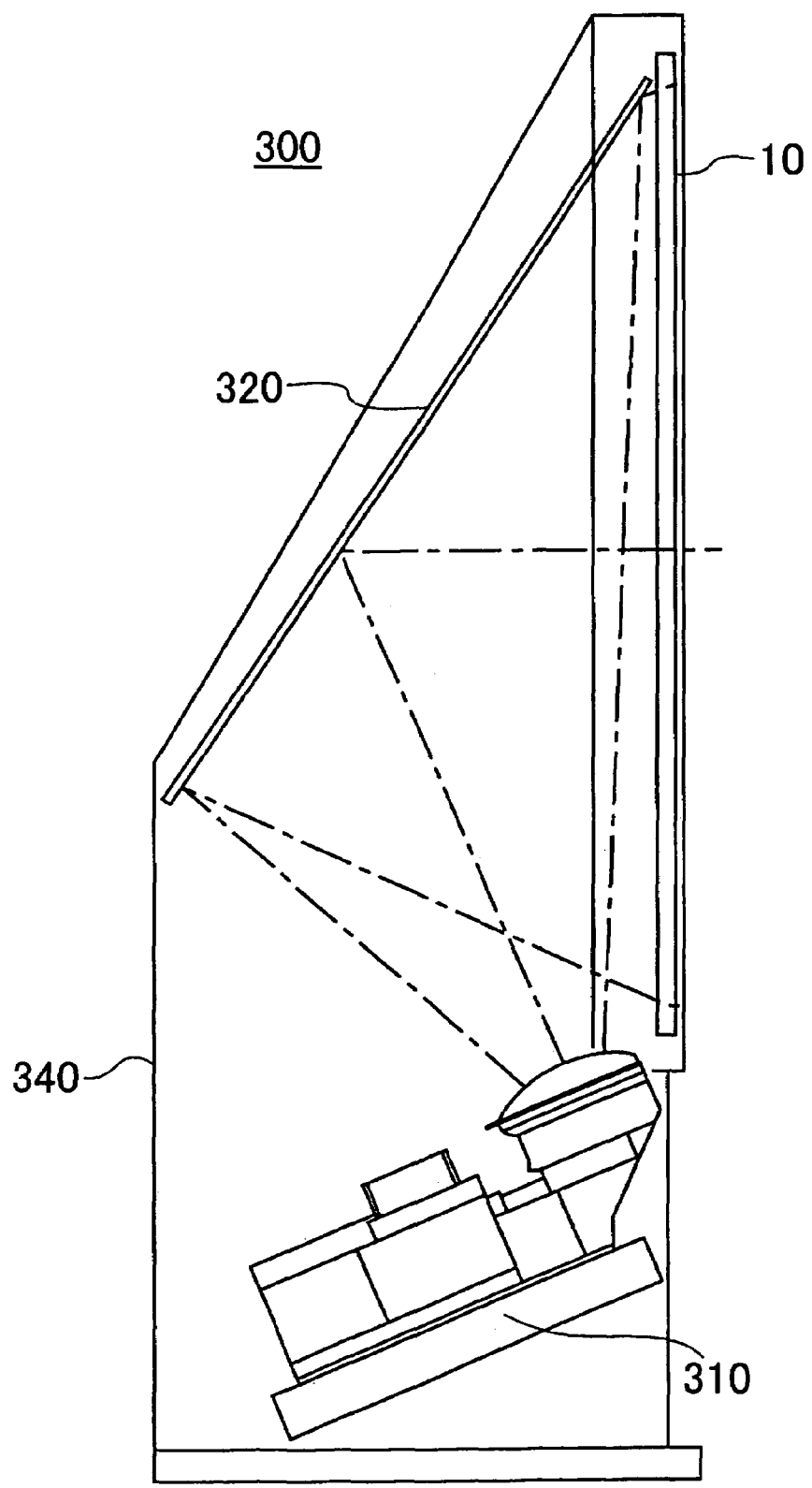
FIG. 9 is a drawing schematically showing a rear projection to which the transmission screen of the present invention is applied.

FIG. 9 is a diagram schematically showing a structure of the rear projection according to the present invention. As shown in FIG. 9, a rear projection 300 has a structure in which a projection optical unit 310, a light guiding mirror 320 and a transmission screen 10 are arranged in a casing 340. Since the rear projection 300 uses the transmission screen 10 that has excellent angle of view characteristics as described above as its transmission screen 10, it forms an excellent rear projection having a high display quality.

As described above, it should be noted that, even though the method of manufacturing a lens substrate with straight light control portions, the lens substrate with straight light control portions, the transmission screen and the rear projection provided with the lens substrate with straight light control portions according to the present invention have been described with reference to the preferred embodiments shown in the accompanying drawings, the present invention is not limited to these embodiments. For example, each element (component) constituting the lens substrate with straight light control portions 1A, 1B, the transmission screen 10 and the rear projection 300 of the present invention may be replaced with one capable of performing the same or a similar function.

Further, in the lens substrate with straight light control portions 1A, 1B of the present invention, a black matrix may be provided on the surface thereof opposite to the surface on which the convex lenses (microlenses) 32 are arranged or between adjacent convex lenses 32. Moreover, in the embodiments described above, even though the structure of the lens substrate with straight light control portions 1A, 1B in which the straight light control portion 4 is provided at either the inside or the outer surface of each of the convex lenses 32 has been described, the straight light control portion 4 may be provided at both the inside and the outer surface of each of the convex lenses 32, for example.

Furthermore, in the embodiments described above, even though the structure in which the straight light control portion 4 is provided in the vicinity of the apex of each convex lens 32 has been described, the straight light control portion 4 may be provided at an unusable lens area such as between adjacent convex lenses 32, for example, in addition to the vicinity of the apex of each convex lens 32. Further, in the embodiments described above, even though it has been described that the substrate manufactured using etching or the like was utilized as the substrate 6 with concave portions, any substrate (substrate manufactured by any method) may be utilized as the substrate 6 with concave portions.

Moreover, it has been described that the microlenses 32 each having a substantially circular shape when viewed from the top of the microlens substrate 3 are regularly arranged, but the shape and arrangement of the microlenses 32 are not limited to the above. For example, the microlenses 32 may be randomly arranged. Furthermore, it has been described that the transmission screen 10 was provided with the lens substrate with straight light control portions 1A, 1B and the Fresnel lens 21 in the above embodiments, but the transmission screen 10 of the invention need not be provided with the Fresnel lens 21 necessarily. For example, the transmission screen 10 may be constructed from only the lens substrate with straight light control portions 1A, 1B of the invention practically.

Further, it has been described for the structure where the microlens substrate 3 (lens substrate) is provided with the microlenses 32 as convex lens in the above embodiments, the convex lens is not limited to the microlens 32. For example, the convex lens may be a lenticular lens. Even in such a structure, it is possible to obtain the function and effect similar to the embodiments described above. Moreover, in the first embodiment described above, it has been described that the straight light control portion 4 was formed by attaching (bonding) the straight light control agent 44 to the vicinity of the apex of each microlens 32, but the method of forming the straight light control portion 4 is not limited thereto. For example, the straight light control agent 44 may be bonded to the vicinity of the apex of each microlens 32 by means of dyeing, chemical coloring, discoloring, or the like. Alternatively, a straight light control portion may be formed by making a large number of minute scratches in the vicinity of the apex of each microlens 32 by means of a physical method such as face roughening.

Moreover, in the embodiments described above, it has been described that the straight light control portion 4 was constituted from one kind of straight light control agent 44, but the present invention is not limited thereto. For example, the straight light control portion 4 may be constituted from two or more kinds of straight light control agents. Furthermore, in the first embodiment described above, it has been described that the straight light control portion 4 was constructed from single layer, but the straight light control portion 4 may be constructed from a layered product formed by laminating (stacking) a plurality of layers respectively containing a plurality of kinds of straight light control agents.

Further, in the embodiments described above, it has been described that the lens substrate with straight light control portions 1A, 1B was a member constituting the transmission screen 10 or the rear projection 300, but the lens substrate with straight light control portions is not limited to that applied to a transmission screen or rear projection, and may be applied to one for any use. For example, the lens substrate with straight light control portions may be applied to a constituent member of a liquid crystal light valve in a projection display.

EXAMPLE

Example 1

First, a soda-lime glass substrate having a rectangle of 1.2 m×0.7 m and a thickness of 4.8 mm was prepared. The substrate of soda-lime glass was soaked in cleaning liquid containing 4 wt % ammonium hydrogen difluoride and 8 wt % hydrogen peroxide to carry out a 6 μm etching process, thereby cleaning its surface. Then, cleaning with pure water and drying with nitrogen ($N_2$) gas (for removal of pure water) were carried out.

Next, chromium films (a mask and a rear face protective film) each having a thickness of 0.03 μm were formed on the soda-lime glass substrate by means of a sputtering method. Namely, a mask and a rear face protective film each made of a chromium film were formed on both surfaces of the substrate of soda-lime glass.

Next, laser machining was carried out to the mask to form a large number of initial holes within a region of 113 cm×65 cm at the central part of the mask. In this regard, the laser machining was carried out using a YAG laser under the conditions of energy intensity of 1 mW, a beam diameter of 3 μm, and an irradiation time of $60 \times 10^{-9}$ sec. In this way, the initial holes were formed over the entire region of the mask mentioned above. The average diameter of the initial holes was 5 μm.

Next, the soda-lime glass substrate was subjected to a wet etching process, thereby forming a large number of concave portions on the soda-lime glass substrate. The large number of formed concave portions (that is, concave surface) had substantially the same curvatures (35 μm) as each other. In this regard, an aqueous solution containing 4 wt % ammonium hydrogen difluoride and 8 wt % hydrogen peroxide was used for the wet etching as an etchant, and the soak time of the substrate was 5 hours.

Next, the chromium oxide films (the mask and rear face protective film) were removed by carrying out an etching process using a mixture of ceric ammonium nitrate and perchloric acid. Then, cleaning with pure water and drying with $N_2$ gas (removal of pure water) were carried out. As a result, a wafer-like substrate with concave portions where a large number of concave portions were formed on the soda-lime glass substrate was obtained.

Next, a mold release agent (GF-6110) was applied to the face of the substrate with concave portions obtained as described above on which the concave portions were formed, and a non-polymerized (uncured) ultraviolet-ray (UV) curing resin (UV-cure resin) (V-2403 (made by Nippon Steel Chemical Co., Ltd.)) was applied to the same face side.

Next, the UV-cure resin was pressed (pushed) with a flat plate constituted from alkali-free glass. At this time, this process was carried out so that air was not intruded between the flat plate and the UV-cure resin. In this case, a mold release agent (GF-6110) was applied in advance onto the face of the flat plate with which the UV-cure resin has been in contact when pushing the UV-cure resin.

Then, by irradiating ultraviolet rays of 10,000 mJ/cm$^2$ through the flat plate, the UV-cure resin was cured and the flat plate and the substrate with concave portions were removed to obtain the microlens substrate provided with a plurality of convex lenses (microlenses). In this regard, the average diameter D of the obtained convex lenses (microlenses) was 70 μm, and the curvature radius of each of the plurality of convex lenses was 35 μm.

Next, an adhesive was applied to the vicinity of the apex of each convex lens in the obtained lens substrate with a roll coater.

Next, a flat substrate, on the surface of which particulates of silica (light diffusion agent) was evenly dispersed was prepared. The adhesive in the vicinity of the apex of each convex lens was brought into contact with the particulates of silica on the surface of the flat substrate, whereby silica was transferred to the vicinity of the apex of each convex lens. In this regard, the particulates of silica of which the average grain diameter was 5 μm were utilized.

Then, by drying (hardening) the adhesive, the straight light control portion was formed in the vicinity of the apex of each convex lens. The average thickness of the straight light control portions thus formed in the vicinity of the apex of each convex lens is 3 μm. Further, the average diameter d of the straight light control portions was 30 μm when viewed from the top of the lens substrate with straight light control portions.

By assembling the lens substrate with straight light control portions manufactured as described above and a Fresnel lens portion manufactured by extrusion molding, the transmission screen as shown in FIG. 3 was obtained.

Example 2

A substrate with concave portions was formed in the manner similar to that in Example 1 described above.

Next, a mold release agent (GF-6110) was applied to the face of the substrate with concave portions obtained as described above on which the concave portions were formed, and a non-polymerized (uncured) ultraviolet-ray (UV) curing resin (UV-cure resin) (V-2403 (made by Nippon Steel Chemical Co., Ltd.), specific gravity: 0.8 g/cm$^3$) to which 0.5 wt % particulates of silica was added as a light diffusion agent was applied to the same face side. In this regard, the particulates of silica of which the average grain diameter and the specific gravity were respectively 5 μm and 1.2 g/cm$^3$ were utilized. After the resin to which the light diffusion agent was added as described above was applied to the substrate with concave portions, the particulates of the light diffusion agent were precipitated gradually.

Next, the UV-cure resin containing the light diffusion agent was pressed (pushed) with a flat plate constituted from alkali-free glass. At this time, this process was carried out so that air was not intruded between the flat plate and the UV-cure resin. In this case, a mold release agent (GF-6110) was applied in advance onto the face of the flat plate with which the UV-cure resin has been in contact when pushing the UV-cure resin.

After the precipitating of the particulates of the light diffusion agent was terminated, by irradiating ultraviolet rays of 10,000 mJ/cm$^2$ through the flat plate, the UV-cure resin was cured and the flat plate and the substrate with concave portions were removed to obtain the lens substrate with straight light control portions. In this regard, the average diameter D of the obtained convex lenses (microlenses) in the lens substrate with straight light control portions was 70 μm, and the curvature radius of each of the plurality of convex lenses was 35 μm. Further, the average thickness of the straight light control portions thus formed in the vicinity of the apex of each convex lens is 5 μm. Moreover, the average diameter d of the straight light control portions was 30 μm when viewed from the top of the lens substrate with straight light control portions.

Example 3

A lens substrate with straight light control portions was formed in the manner similar to that in Example 1 described above except that a black resist (light shielding agent) was utilized as the straight light control agent. Then, a transmission screen was obtained using the formed lens substrate with straight light control portions. In this regard, the black resist (light shielding agent) of which the average grain diameter was 6 μm were utilized.

Further, in the case where a transmission ratio of light of the formed lens substrate with straight light control portions was defined as $X_1$(%) and a transmission ratio of light in the case of not containing the straight light control agent in the straight Light control portion is defined as $X_2$(%), the ratio $X_1/X_2$ was 0.8. Moreover, the average thickness of the straight light control portions thus formed in the vicinity of the apex of each convex lens is 4 μm. Furthermore, the average diameter d of the straight light control portions was 30 μm when viewed from the apex of the lens substrate with straight light control portions.

Example 4

A lens substrate with straight light control portions was formed in the manner similar to that in Example 2 described above except that ink (light shielding agent) was utilized as the straight light control agent. Then, a transmission screen was obtained using the formed lens substrate with straight light control portions. In this regard, the black resist (light shielding agent) of which the average grain diameter was 6 μm were utilized.

Further, in the case where a transmission ratio of light of the formed lens substrate with straight light control portions was defined as $X_1$(%) and a transmission ratio of light in the case of not containing the straight light control agent in the straight light control portion is defined as $X_2$(%), the ratio $X_1/X_2$ was 0.9. Moreover, the average thickness of the straight light control portions thus formed in the vicinity of the apex of each convex lens is 2 μm. Furthermore, the average diameter d of the straight light control portions was 30 μm when viewed from the top of the lens substrate with straight light control portions.

Comparative Example

A microlens substrate was formed in the manner similar to that in Example 1 described above except that straight light control portions were not formed. Then, a transmission screen was obtained using the formed microlens substrate.

(Manufacturing of Rear Projection and Evaluation Thereof)

A rear projection as shown in FIG. 9 was manufactured (assembled) using the transmission screen manufactured in each of Examples 1 to 4 and Comparative Example. The angles of view in the horizontal direction (that is, the angle (α angle) at which luminous intensity became a half of the maximum value and the angle (β angle) at which luminous intensity became one third of the maximum value) were measured using a gonio photometer. The result was shown in TABLE 1.

TABLE 1

|  | α angle at which luminous intensity became half (°) | β angle at which luminous intensity became one third (°) |
| --- | --- | --- |
| Example 1 | 22 | 30 |
| Example 2 | 23 | 32 |
| Example 3 | 20 | 27 |
| Example 4 | 19 | 26 |
| Co. Example | 8 | 15 |

As a result, it was confirmed that the rear projection provided with the transmission screen obtained in each of Examples 1 to 4 had excellent angle of view characteristics in which the both α and β angles were wide compared with the rear projection provided with the transmission screen obtained in Comparative Example. In particular, the rear projection provided with the transmission screen using the light diffusion agent had more excellent angle of view characteristics. Further, in the rear projection obtained in each of Examples 1 to 4, the image was brightly displayed with respect to each of angles of view measured.

On the other hand, the rear projection provided with the transmission screen obtained in Comparative Example had inferior angle of view characteristics because the difference of the amounts of light was wide.

What is claimed is:

1. A method of manufacturing a lens substrate with straight light control portions, the lens substrate being provided with a plurality of microlenses each having a convex curved surface on a surface thereof, the lens substrate being used so that light enters the lens substrate from the side of the surface thereof on which the plurality of microlenses are provided, the convex curved surface of each microlens as a whole allowing the light to pass, the method comprising the steps of:

preparing a substrate having a plurality of concave portions on one surface thereof;

forming the plurality of microlenses using the substrate having the plurality of concave portions; and forming a straight light control portion in the vicinity of the apex of each of the plurality of microlenses, the straight light control portion being used for controlling the ratio of straight light in the light entering each of the plurality of microlenses from the side of the surface of the lens substrate, wherein, in the case where the average diameter of the microlenses and the average diameter of the straight light control portions are respectively defined as D and d when viewed from the apex of the lens substrate, then D and d satisfy the relation: $1.2 \leq D/d \leq 5$.

2. The method as claimed in claim 1, wherein the straight light control portion is formed of a straight light control agent.

3. The method as claimed in claim 2, wherein the straight light control agent is mainly made of a light diffusion agent that has a function of diffusing light.

4. The method as claimed in claim 2, wherein the straight light control agent is mainly made of a light shielding agent that has a function of reducing the amount of transmitted light as the whole lens substrate.

5. The method as claimed in claim 4, wherein, in the case where a transmission ratio of light of the straight light control portion is defined as $X_1$ (%) and a transmission ratio of light in the case of not containing the straight light control agent in the straight light control portion is defined as $X_2$ (%), then $X_1$ and $X_2$ satisfy the relation: $0.1 \leq X_1/X_2 \leq 1.0$.

6. The method as claimed in claim 2, wherein the step of forming the plurality of microlenses each having a straight light control portion includes the step of bringing a liquid including at least the straight light control agent into contact with the vicinity of the apex of each of the microlenses.

7. The method as claimed in claim 2, wherein the straight light control portion is formed of an adhesive and the straight light control agent.

8. The method as claimed in claim 7, wherein the step of forming the plurality of microlenses each having a straight light control portion includes the steps of:

applying the adhesive to the vicinity of the apex of each of the microlenses; and applying the straight light control agent onto the adhesive.

9. The method as claimed in claim 1, wherein the average thickness of the straight light control portions in the vicinity of the apex of each microlenses is in the range of 0.5 to 500 µm.

10. The method as claimed in claim 1, wherein the average diameter d of the straight light control portions is in the range of 10 to 500 µm.

11. The method as claimed in claim 1, wherein the average diameter D of the microlenses is in the range of 10 to 500 µm.

12. A lens substrate with straight light control portions manufactured using the method defined by claim 1.

13. A lens substrate with straight light control portions, the lens substrate being used so that light enters the lens substrate from the side of the surface thereof on which the plurality of microlenses are provided, comprising:

a lens substrate provided with a plurality of microlenses each having a convex curved surface on a surface thereof, the convex curved surface of each microlens as a whole allowing the light to pass; and a plurality of straight light control portions for controlling the ratio of straight light in the light entering each of the plurality of microlenses from the side of the surface of the lens substrate, each of the straight light control portions being provided in the vicinity of the apex of each of the microlenses, wherein, in the case where the average diameter of the microlenses and the average diameter of the straight light control portions are respectively defined as D and d when viewed from the apex of the lens substrate, then D and d satisfy the relation: $1.2 \leq D/d \leq 5$.

14. The lens substrate with straight light control portions as claimed in claim 13, wherein each of the straight light control portions is formed on the outer surface of each of the microlenses and in the vicinity of the apex of each of the microlenses.

15. The lens substrate with straight light control portions as claimed in claim 13, wherein the average thickness of the straight light control portions in the vicinity of the apex of each microlenses is in the range of 0.5 to 500 µm.

16. The lens substrate with straight light control portions as claimed in claim 13, wherein the straight light control portions are formed of a material containing a particulate straight light control agent, and the average grain diameter of the straight light control agent is in the range of 0.1 to 200 µm.

17. A transmission screen comprising the lens substrate with straight light control portions defined by claim 13.

18. The transmission screen as claimed in claim 17, further comprising a Fresnel lens portion with a plurality of Fresnel lenses, the Fresnel lens portion having an emission face and the plurality of Fresnel lenses being formed in the emission face wherein the lens substrate with straight light control portions is arranged on the side of the emission face of the Fresnel lens portion.

19. A rear projection screen comprising the transmission screen defined by claim 17.

20. A rear protection system, comprising:

the rear protection screen defined by claim 19;

a projection optical unit; and a light guiding mirror.

* * * * *